FLAT CABLE PROCESS

Filed Nov. 7, 1966

United States Patent Office 3,473,218
Patented Oct. 21, 1969

3,473,218
FLAT CABLE PROCESS

Lawrence R. Travis, Brockton, Mass., assignor to Electro Connective Systems, Inc., Brockton, Mass., a corporation of Massachusetts
Filed Nov. 7, 1966, Ser. No. 592,605
Int. Cl. H01b 13/06
U.S. Cl. 29—624 3 Claims

ABSTRACT OF THE DISCLOSURE

The disclosure relates to a process of providing isolated electrical conductors on an insulative support by partially cutting conductive material affixed to said support and simultaneously removing portions of the partially cut material by pulling and tearing.

This invention relates to flat cable and in particular provides methods and apparatus for forming a plurality of thin conductors which are laterally spaced apart and extend lengthwise along an indefinite length of a thin tape of dielectric material. Normally the conductors are also covered by a second thin tape of dielectric material in order to insulate them such that they are useful as connective harnesses in various electrical systems.

Such flat cables have heretofore been made by several techniques, each of which suffers certain disadvantages, particularly when the thickness of the conductor becomes on an order of less than ten mils (0.010 inch). While for larger conductor sizes it is feasible to guide separate conductors between a pair of dielectric tapes while feeding the assembly between a pair of laminating rolls, usually with an adhesive coat on the inner side of one or both of the tapes, when smaller sizes of flat cable are manufactured, the art has turned to those methods commonly employed in the printed circuitry art, that is, forming of a lamination of a thin dielectric tape and a conductor metal foil, applying resist and etching to remove portions of the foil, such that laterally spaced conductor sections remain on the tape extending lengthwise along the tape. While the lamination can be made by feeding the conductor metal foil and an adhesively coated dielectric tape through a pair of laminating rolls the dimensional stability of the dielectric materials which can be applied in this manner leaves something to be desired and the preferred dielectric materials are polyimide, polyamide-imide and polyamide-polyimide resins. These materials can be applied by spray, dip or otherwise coating one side of the conductor metal foil with an enamel which when heated and dried forms a resin and foil lamination; for example, the coating process suggested in Werberig Patent No. 2,849,298 for the production of printed circuitry can be used. Polyimide materials which are suited for this purpose are commercially available in liquid enamel form and are conventionally used in enameling wire. One such material is, for example, PYRE ML, a proprietary product, which is a copolymer of pyromellitic di-anhydride and a diamine. More preferred, however, is the polyamide-polyimide material known as AI–10, a proprietary product which has been available commercially for sometime in the form of a finished lamination of resin and copper foil. The lamination is a proprietary product known as AI–220. AI–10 is a copolymer of trimellitic anhydride and a diamine and is now available commercially in a liquid enamel form (C & EN, Oct. 3, 1966, page 55) making it highly suitable in one aspect of this invention to provide a continuous process for forming flat cable insulated on both sides with the resin. The resulting product is highly desirable because of its dimensional stability, its resistance to acids and solvents and its resistance to extreme temperatures.

The principal difficulty with prior method of forming thin flat cable, i.e., etching a lamination of dielectric tape and conductor metal foil to form the conductors by selective removal of portions of the foil lies in the number of steps required to remove the undesired portions of the foil lamina. Thus resist must be applied, then etchant, and finally the resist must be removed (see the above Werberig patent).

It is, therefore, the principal object of this invention to provide a process in which the desired portion or portions of foil are removed continuously from such a dielectric tape and metal foil lamination in a single step.

In another aspect, this invention provides an operation in which a thin tape of metal foil is passed through a coating apparatus to coat one side of the foil with a dielectric resin, then to the foil removal apparatus, and then doubled back to the coating apparatus to coat the opposite side of the foil with resin.

In accordance with this invention, the foil lamina of a tape lamination of foil and dielectric is cut lengthwise at a pair of points which are always simultaneously laterally spaced on each side on each strip of foil to be removed to a depth less than the total thickness of the foil, while the foil to be removed is pulled simultaneously at an angle away from the surface of the tape, thereby applying stresses to the foil at and between the pair of cutting points sufficient to overcome the bond between the metal foil and tape and to complete the cuts through the foil by ripping, thereby removing the undesired foil section or sections.

It will be apparent that suitable apparatus for carrying out the above process can assume two basic forms. In one case the apparatus can move lengthwise along the lamination. In the preferred case the apparatus is stationary while the tape lamination is passed through the apparatus.

For a more complete understanding of this invention, reference is made to the appended drawings in which.

Figures 1, 2, 3, 4, 5:
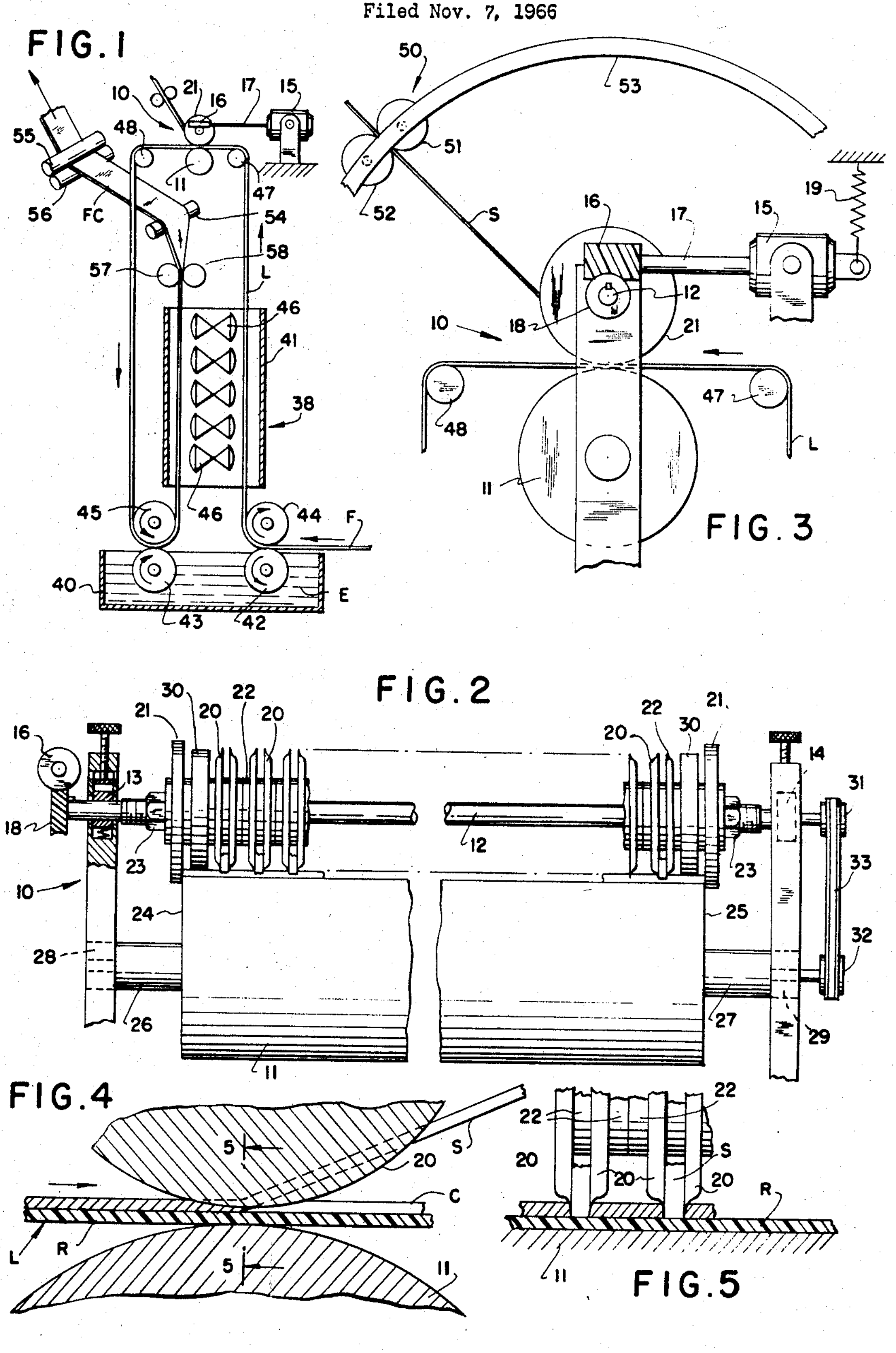
FIG. 1 is a schematic diagram representing a continuous process for the production of flat cable in accordance with this invention by coating resinous material on each side of the foil with selective foil removal intermediate the coating operations.
FIG. 2 is an elevation of the foil removal apparatus.
FIG. 3 is an end view of the apparatus shown in FIG. 2.
FIG. 4 is an enlarged vertical section taken at line 4—4 in FIG. 2.
FIG. 5 is a section taken at line 5—5 in FIG. 4.

Referring more particularly to FIG. 1, the reference numeral 10 generally designates a foil removal apparatus in accordance with the present invention, while the reference numeral 38 designates an offset coating device including a drying oven.

Referring more particularly to FIGURES 2 and 3, foil removal apparatus 10 includes a steel backing roller 11, a cutting wheel axle 12 which is mounted parallel to and spaced a short distance away from backing roller 11 in a pair of journals 13 and 14 located at opposite ends of axle 12. Journals 13 and 14 include thrust bearings designed to permit a limited movement, i.e., on the order of several thousandths of an inch of axle 12 in the plane of the axes of cylinder 11 and axle 12. Journals 13 and 14 are further mounted such that their position can be adjusted in that plane on an order of movement equal to the maximum variation in thickness of lamination to be handled by apparatus 10.

A drive motor 15, which is mounted pivotally on an axis parallel to that of axle 12, has a worm gear 16 on its drive shaft 17 such that worm gear 16 meshes with a bevel gear 18 affixed to the end of axle 14 adjacent journal 13. Motor 15 is spring biased, as indicated by the reference numeral 19, to hold worm gear 16 firmly against bevel gear 18.

Axle 12 carries a plurality of cutting wheels 20 which are each affixed to axle 12 such that they rotate with axle 12 but can be moved lengthwise of axle 12. The number of cutting wheels 20 is determined by the number of the conductors which it is desired to form on the finished flat cable, one adjacent pair of cutters 20 being required for each portion of the foil which is to be removed. In addition, two shear cutters 21 optionally can be located one at each end of the axle 12 which function to slit the lamination feed to foil removal apparatus 10 and trim to the desired overall transverse dimension. Cutters 21 are mounted on axle 12 similarly to cutters 20 and differ in greater overall diameter. Journals 13 and 14 should be constructed to permit simple removal of axle 12 such that cutters 20 and 21 can be changed in position, size or number as the requirements for the production of flat cable can differ in dimension and number of conductors.

Each cutter 20 and 21 is spaced along axle 12, fixed relative one to the other, by means of washers 22, and as later noted by a pair of wheels 30, and held in position on axle 12 by nuts 23 mounted on the ends of axle 12 inside of journals 13 and 14.

Journals 13 and 14 are normally adjusted in the plane of the axes of axle 12 and cylinder 11 to bring the square rims of cutters 21 firmly against the side surfaces 24 and 25 of the opposite ends of cylinder 11. Cylinder 11, it will be noted, carries axial stub shafts 26 and 27 at its opposite ends which are housed for rotation in fixed thrust bearings 28 and 29, respectively, which should be designed to permit changing cylinder 11 to substitute other cylinders 11 having different lengths dependent upon the desired lateral dimension of the flat cable.

It will be noted that, referring particularly to FIGURES 4 and 5, each cutter 20 is positioned such that its cutting edge will penetrate a limited depth in the foil F backed on resin R of the lamination L fed to apparatus 10 when the resin backing R rides between cutters 20 and cylinder 11 facing cylinder 11. Normally, the cutting depth of cutters 20 is about two-thirds the thickness of foil F. This can vary, however, dependent upon the width of the strip S to be removed, the particular resin R, the conductor material forming foil F, and the bonding strength of the resin R to foil F.

It will be evident that a pair of cutters 20 is associated with each strip S of foil F to be removed and consequently the space between each such adjacent pairs of cutters 20 (see FIG. 5) is the space where foil F is to remain bonded to resin R to form a conductor C. As can be seen best in FIG. 5, the rim of each cutter 20 is preferably formed with a sharp edge on the side of cutter 20 facing strip S while it is radiused on the side on which conductor C is formed. Such construction prevents the formation of burrs along the edge of the resultant conductor which is desirable both for electrical reasons and for subsequent coating reasons.

A removable wheel 30 is rotatably mounted on axle 12 at each end inside of each cutting wheel 21. Each wheel 30 has a diameter equal to the radius of each cutter 20, less the desired cutting depth and thus functions to move axle 12 toward or away from cylinder 11 in accordance with variations in the thickness of resin R in order to insure accurate cutting depth in foil F. It is for this reason that journals 13 and 14 are designed to permit limited movement of axle 14, and for this reason it is also necessary to spring bias axle 12 toward cylinder 11. Apparatus 10 further includes a drive mechanism for cylinder 11 which includes a sprocket 31 on the end of axle 12 opposite bevel gear 18 and a sprocket 32 on stab shaft 27 which are interconnected by a link chain 33. Sprockets 31 and 32 are sized such that cylinder 11 and cutters 20 have the same peripheral angular velocity as the linear velocity of lamination L fed between them.

Referring more particularly to FIG. 1, the foil removing apparatus 10 is associated, as noted above, with an offset coating device 38. Offset coating device 38 includes a tank 40 for containing the enamel E to be applied on one side of foil F to form resinous coating R as it passes through a drying oven 41 and to which foil F is returned after the foil removal operation at apparatus 10 for a second pass to coat the other side of foil F and then pass again through drying oven 41 to form a finished flat cable FC having a plurality of flat, spaced conductors C encapsulated between a pair of resinous coatings of dielectric material. While in FIG. 1 only single pass operation is illustrated for each coat, those familiar with coating will be aware several passes are frequently required to build up an adequate thickness of coating.

Thus, referring to FIG. 1, tank 40 contains a pair of rolls 42 and 43 which are horizontally centered on a common plane and are parallel to each other and the lower portions of which are immersed in the liquid enamel E from which the resinous coating is to be formed. Superposed above rolls 42 and 43 are a second pair of rolls 44 and 45, respectively, which are driven rolls and are tangentially in contact with rolls 42 and 43, respectively, which are idler rolls. Drying oven 41 is located immediately above rolls 44 and 45 and includes a number of infra-red lamps 46 centrally positioned, and directed in even quantities in opposite horizontal directions in a vertical plane passing centrally between rolls 44 and 45 approximately coincident with the vertical plane in which cylinder 11 and axle 12 are located.

In addition, a pair of idler rollers 47 and 48 are located above drying oven 41 and are positioned parallel to each other with their upper surfaces tangential in a common horizontal plane with the upper surface of cylinder 11. Roller 47 has its side remote from cylinder 11 tangential in a common vertical plane with the side of rollers 42 and 44 facing rollers 43 and 45, while roller 48 has its side remote from cylinder 11 tangential in a common vertical plane with the sides of rollers 43 and 45 remote from rollers 42 and 44.

An indefinite length of tape of conductor foil F to be formed into a flat cable FC is cleaned, degreased and surface prepared to be receptive to coating. Foil F then is passed between rollers 42 and 44 drawn by the roller 44 with the result that roller 42 picks up a coating of enamel E in tank 40 and undercoats the prepared surface of foil F. Foil F then with such coating then passes upwardly to oven 41 in which those lamps 46 directed toward it bake the enamel coat into a firm, adherent resinous coating R. As the lamination L thus formed travels upwardly out of oven 41 it passes about roll 47 and thence horizontally and tangentially toward the upper surface of cylinder 11 with resin side R, beneath foil F, thence beneath cutters 20 and 21 to cut the desired pattern and dimensions of foil F required for the finished flat cable FC.

As the operation is started out it is necessary, of course, manually to peel back those sections S of foil F to be removed after they have passed beneath cutters 20 and place these in a pulling device 50, which consists of a pair of rubber pinch rolls 51 and 52 which are driven in synchronism in opposite directions to pull the strip sections S of foil F away from the upper surface of resin R. Pinch rolls 51 and 52 obviously assume the same peripheral angular velocity as the linear velocity of lamination L and for that matter of foil F through the entire apparatus. However, they should be driven by a motor which is capable of driving rolls 51 and 52 at any torque desired in order to control the tension on the removed strips S.

Pinch rolls 51 and 52 should further be mounted in guides 53 which will permit their adjustment through an arc centered on the point of cutting at which each cutter 20 makes its maximum cut in foil F. As the desired angle at which the removed strips S are taken off varies with the bond strength between foil F and resin R, the thickness of foil F, as well as the particular conductor material and the spacing width of the cutters 20 between the strips S to be removed, this angle can vary depending upon such variables from as little as 5 degrees of inclination from the surface of resin R to angles in excess of 120 degrees or more.

It will be apparent, referring particularly to FIGURES 4 and 5, that as operation continues, pinch rolls 51 and 52 are set with sufficient torque to pull strips S such that the stresses exerted on strips S are sufficient to overcome the bond between strips S and resin R and to complete the cut formed by cutters 20 through a ripping action, thereby leaving on resin R a series of parallel conductors C.

Referring again to FIG. 1, as the resinous backing R with conductors C passes from cylinder 11 over idler 48, it is carried downwardly outside of oven 41 between rolls 43 and 45 where the side of resin R containing conductors C is on the underside and hence receives a coating of enamel E from roll 43. Ordinarily the exposed surfaces of conductors C will require cleaning, degreasing and surface preparation before coating as they pass between idler 48 and rolls 43 and 45. The then coated lamination is drawn upwardly through oven 41 opposite lamps 46 in which the second coating of enamel E becomes resinous and forms a dielectric coating over conductors C to complete their encapsulation. As the then finished cable FC emerges from the upper end of oven 41 it is passed over an idler roller 54 which is located beneath cylinder 11 and canted with respect to thereto to permit flat cable FC to be drawn by a pair of driven pinch rolls 55 and 56 to a takeup spool without interfering with the passage of lamination L on its course over cylinder 11 between idlers 47 and 48. In order to prevent twisting of cable FC in oven 41 induced by the position of roll 54, a pair of idler rollers 57 and 58 through cable FC passes are located above oven 41 and beneath roller 54.

It will be apparent that many variations of apparatus are suitable for carrying out the method of this invention and in addition to that described above with reference to the drawings. Although separate cutting wheels are shown two or more adjacent wheels can be made as a single wheel with two or more cutting edges. In particular, it should be noted that, although cutter wheels have been described, knives or similar devices can be used to slit and the manner of cutting is not critical. What is critical in order to preserve the integrity of the underlying resin R is that the other methods of cutting, shearing or slitting or otherwise, should not be completely through the foil.

I claim:

1. In a process for forming a plurality of conductors spaced laterally apart and extending lengthwise along an indefinite length of a thin tape of dielectric material by the selective removal of one or more lengthwise strips of a thin conductor metal lamina on a surface of said tape which includes: cutting said metal on the surface thereof remote from said tape to a depth less than the thickness of said metal continuously along said metal lengthwise of said tape at a pair of simultaneously laterally spaced points to define the edges of each strip to be removed and simultaneously pulling the thusly cut strip at an angle away from said surface of said tape to exert stresses at and between the pair of cutting points sufficient to overcome the bond between said metal and said tape and to complete said cuts through said metal by ripping whereby each said strip is removed from said tape.

2. A process according to claim 1 which further includes a preliminary step of forming the lamination of conductor metal and tape of dielectric material and thereafter feeding said lamination of metal and dielectric tape directly to said cutting and pulling operation defined in claim 1 and thereafter applying a second tape of dielectric material to the exposed surfaces of said metal strips remaining on said first tape of dielectric material to encapsulate the same, said operation being formed in a continuous line.

3. A process according to claim 2 in which said tapes of dielectric material are applied as coatings of liquid enamel which is subseqeuntly set to a resinous material.

References Cited

UNITED STATES PATENTS

| | | | | |
|---|---|---|---|---|
| 1,854,481 | 4/1932 | Mudd | 83—5 | XR |
| 1,940,106 | 12/1933 | Snyder | 83—5 | XR |
| 3,022,207 | 2/1962 | Lang | 156—270 | XR |

FOREIGN PATENTS

| | | |
|---|---|---|
| 933,385 | 8/1963 | Great Britain. |

JOHN F. CAMPBELL, Primary Examiner

R. W. CHURCH, Assistant Examiner

U.S. Cl. X.R.

29—625; 83—5; 156—248, 249, 268, 270; 174—68.5, 117